(12) United States Patent
Waltz

(10) Patent No.: US 6,513,955 B1
(45) Date of Patent: Feb. 4, 2003

(54) LIGHT MODIFIER

(75) Inventor: Thomas A. Waltz, Sylvania, OH (US)

(73) Assignee: F. J. Westcott Company, Toledo, OH (US)

(*) Notice: Subject to any disclaimer, the term of this patent is extended or adjusted under 35 U.S.C. 154(b) by 0 days.

(21) Appl. No.: 09/685,183

(22) Filed: Oct. 11, 2000

(51) Int. Cl.$^7$ .............................. F21V 1/06; F21V 1/14
(52) U.S. Cl. .................. 362/352; 362/16; 362/355; 362/439; 362/450
(58) Field of Search .......................... 362/16–18, 278, 362/355–358, 352, 320, 437–440, 443–445, 448, 450, 455, 351

(56) References Cited

U.S. PATENT DOCUMENTS

| | | | | |
|---|---|---|---|---|
| 2,177,204 A | * | 10/1939 | Buzick et al. | 362/351 |
| 2,680,317 A | * | 6/1954 | Lewis | 362/357 |
| 4,052,607 A | * | 10/1977 | Larson | 362/18 |
| 4,504,888 A | * | 3/1985 | Rosenthal | 362/18 |
| 4,757,425 A | | 7/1988 | Waltz | 362/18 |
| 5,154,503 A | | 10/1992 | Sternsher | 362/16 |
| 5,915,828 A | * | 6/1999 | Buckley | 362/17 |

* cited by examiner

Primary Examiner—Alan Cariaso
(74) Attorney, Agent, or Firm—Emch, Schaffer, Schaub & Porcello Co., L.P.A.

(57) ABSTRACT

A light modifier for use with a light source has a frame defining a plane that is spaced apart from a face of the light source. The frame has at least one side member extending from the frame in a direction toward the light source. A locking mechanism is operably attached to the side member for releasably locking the frame into an open position. The frame is collapsible to a closed position inside a cover. The cover has at least one pocket for receiving a light diffusion member.

16 Claims, 4 Drawing Sheets

LIGHT MODIFIER

BACKGROUND OF THE INVENTION

The present invention relates to a light diffuser or modifier for use with light sources for image makers in the photography, film, video and motion picture industries. The present invention is especially useful with lighting fixtures that are used in many different applications such as background lighting, studio lighting, video conferencing, news and broadcast, portrait photography, commercial photography and the motion picture and film industries.

Diffused or indirect lighting is used in both still and motion picture type photography. To achieve an indirect, soft-type lighting effect, it is desirable to first either directly or indirectly pass the light through a thin layer of translucent or transparent material to break-up and diffuse the light rays. Such lighting is generally produced by light sources which are remote from the cameras.

Each particular area to be lighted dictates the type and intensity of the light that will be needed. In some situations, direct light from the light source without any alteration may be required. In other situations, direct light may be too long or cast overly distinct shadows in which case a more diffused light will be more desirable. In still other cases, an even more indirect diffused light may be needed to created the proper lighting effect. It is also important to have a great deal of uniformity in lighting to assist the image maker in properly lighting the subject. Two types of light diffusers include U.S. Pat. Nos. 4,757,425 and 5,154,503 which are incorporated herein by reference.

The industry has developed a type of light box which fits onto the light and provides a source of diffused light. In the past, the light boxes included a fabric material and four rods which were inserted into openings in the material to give the soft box its square shape. From there, those rods were placed into an adaptor ring which held the light source. On the front of the material was a diffusion panel which the light rays pass through in order to soften the lighting. Typically, the image maker purchased many different appropriate sized light boxes to meet all his needs. There are hundreds of companies in the market making lights and each light takes a different size adapter ring which is specific to the light.

Various companies have front panels which adhere with a Velcro® type material to the light box to provide different densities of diffusion type product. While this feature is advantageous, there are literally hundreds of choices of diffusion products in the marketplace. The few products which attach with a Velcro® type product on the front of a diffuser do not provide the image maker with the desired versatility. Therefore, the image maker often cuts different fabrics or colored gels, which are plastic heat resistant colored panels, and attaches them using paper clips to the front of the unit in order to get the desired look.

A major drawback to this system is that by the time the light box unit is constructed using the four rods and the adapter ring, the image maker has consumed valuable time. This is especially important in the video film industry where the image makers arrive in a location and literally have thirty seconds to get the shot that they need, while in reality, setting up of the unit takes five or so minutes in order to achieve the necessary lighting. The image makers are faced with a dilemma of either having a shot with bad lighting or having no shot at all. Further, both the light boxes and adapter rings are very expensive and not easily stored.

The light diffuser should be capable of being used with almost any type of light and preferably be readily and easily attached to and detached from the light source. It is also desirable to have a light diffuser that is a compact, self-contained unit that is easy to position and store.

It is an object of the present invention to provide a light diffuser or modifier that will yield such lighting through a device that is light-weight, compact, easily transported, and readily and easily attached to and detached from the light source.

It is a further object of the present invention to provide a light modifier that is useable with a wide variety of light sources.

Other objects and advantageous of the present invention will become more apparent from a further review of the following specification, drawings and claims.

SUMMARY OF THE INVENTION

The present invention relates to a light diffuser or modifier which may be readily and easily attached to and detached from many types of light source to provide diffused light for many types of image making purposes.

The light modifier of the present invention comprises a collapsible frame contained within a cover. The frame is moveable from a substantially planar or collapsed, position for storage to an open, or three-dimensional, position for attachment to a light source. The frame has a first support member and a pair of opposing side frame members. Each side frame member is pivotally mounted to at a first end to the first support member for movement from a collapsed position, where the side frame members are substantially planar to the first support member, to an open position for engagement with the light source, where the side frame members are at an angle, preferably at substantially perpendicular angle, with respect to the first support member. The frame further includes a light support member which is rotatably attached to a second end of one of the side frame members. The light support member is attached to the second end of the one side frame member such that the light support member and the first support member are in a substantially parallel relationship when the light modifier of the present invention is in the open or three-dimensional position. The light support member is adapted to receive or be affixedly mounted to and removed from a light source.

The frame is removably positioned in a cover. The cover includes a transparent pocket which is substantially parallel to the first support member. The pocket of the cover is adapted to slideably receive different density gel and/or diffusion fabrics. In a preferred embodiment, the pocket is made of a clear heat shield fabric which retains its integrity and transparency when exposed to various heat intensities. The pocket allows the image maker to use any type of gel or diffusion fabric.

The presence of the pocket in the light modifier of the present invention provides a clear advantage since there are three main types of gels. The first type of gel is used to change the diffusion to either greater or lesser diffusion. The second type is used to change the actual color of the lights. For example, there are lights in the marketplace that have more of a yellow tone and lights in the marketplace that have more of a blue tone. The blue lights provide the brightest light while the yellow light represents more of a yellow white light that is caused by sunlight. With the second type of gel, the light can be changed from yellow to blue and vice versa. The third type of gel is used for background lights for such situations as where the image maker has a gray background and wants to add some blue coloring by placing a blue gel in front of the light.

The light modifier of the present invention allows the image maker to slide hundreds of types of gels and/or diffusion fabrics in the pocket in the cover to create any type of look desired by the image maker. Further, the image maker can slide multiple gels in the pocket at the same time to create literally thousands of different lighting set-ups. The image maker does not need to staple, clip or alter the gel product or diffusion product in any way in order to achieve this effect.

The present invention is collapsible which aids the image maker in both the set up and the storage of the diffuser. During assembly, the image maker grabs the light support member and matingly engages it with one side frame member, as will be described in detail below. This assembly literally takes seconds as compared to the process of setting up the light boxes described above. The light modifier of the present invention allows the image maker to quickly get a shot while not only the being the first to set up and get the coverage needed, but also the benefit of quickly lighting the subject in a desired manner.

Yet another advantage of the present invention is that the light modifier quickly collapses and can be simply stored. Often image makers store products in lighting kits which are huge briefcases or suitcases. The light modifier of the present invention is both compact and allows all the pieces of the light modifier to remain together for ease of assembly without having to keep track of or hunt around for missing parts.

The light modifier of the present invention provides the image maker with an increased versatility since the modifier can be used with many types of light sources. The present invention offers remarkable versatility not found in other products.

The light modifier of the present invention can be made in different sizes and shapes. For ease in explanation, and in conjunction with the drawings, the light modifier will be shown as substantially square, however, it should be understood that other shapes including rectangular, circular, oval and the like are within the contemplated scope of the present invention and that such uses are contemplated by the inventor herein.

DESCRIPTION OF THE PREFERRED EMBODIMENT

Figure 1:
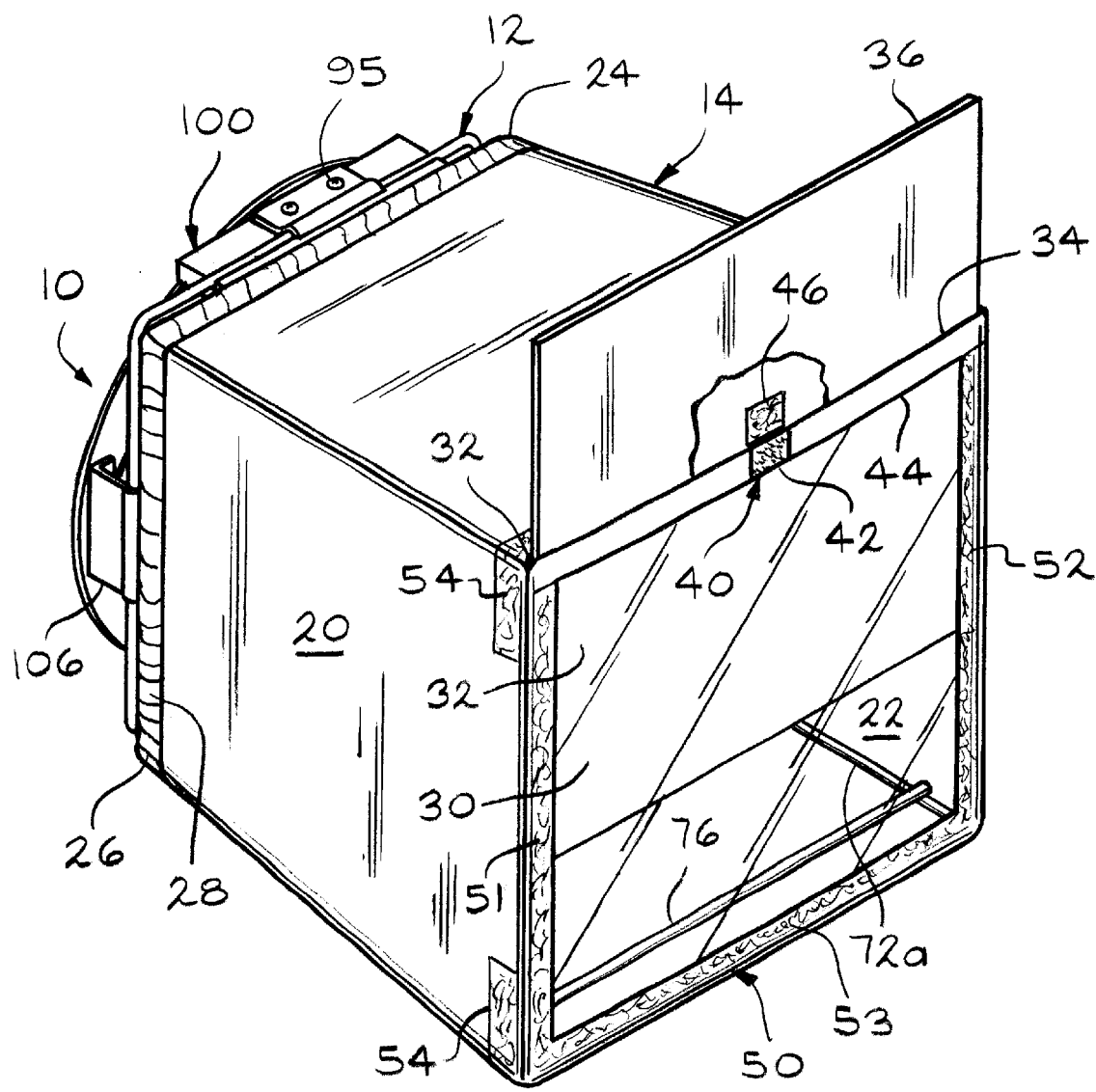
FIG. 1 is a perspective view showing the light modifier of the present invention having a gel partially inserted thereinto.

Referring now to the drawings, there is shown in FIG. 1 a light modifier 10 of the present invention.

Figure 2:
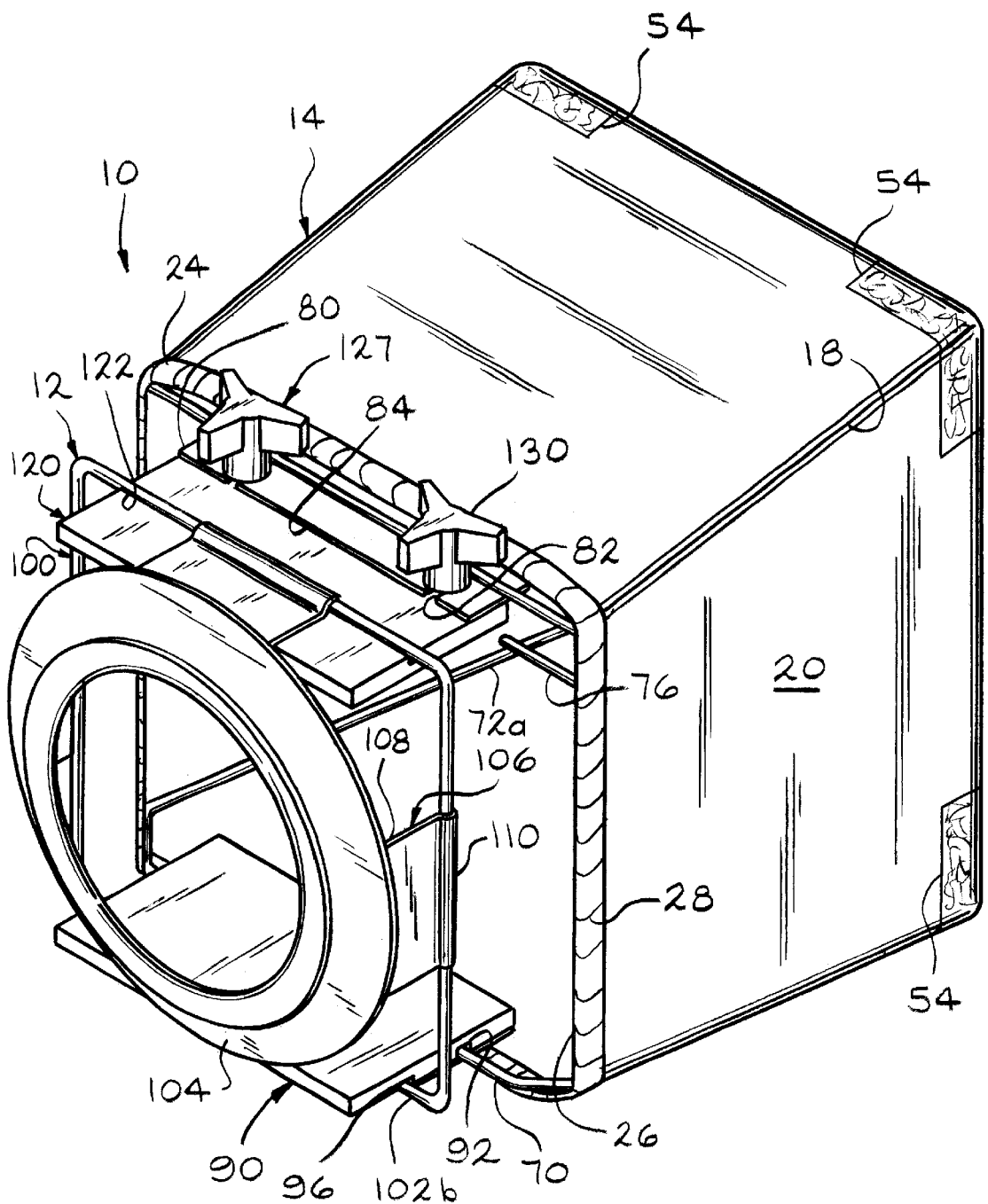
FIG. 2 is a view similar to FIG. 1, but showing a rear view of a partially assembled light modifier.

As can be more clearly seen in FIG. 2, the light modifier 10 includes a frame assembly 12 which is removably positioned within a cover 14. The cover 14 of the light modifier 10 includes at least one, and preferably at least two, transparent panels 30 and 32 which, when the light modifier is fastened to a light source (not shown), the transparent panel 30 is spaced from and generally parallel to the light source (not shown).

In a preferred embodiment, the cover 14 has a first or outer transparent member panel 30 and at least one inner transparent panel 32. The outer transparent panel 30 and inner transparent panel 32 define an opening or pocket 34. The pocket 34 can receive any suitable diffusion product 36 such as a gel or fabric.

The cover 14 also has an exterior surface 20 which comprises a type of fabric material made of a generally opaque material and preferably includes a reflective interior surface 22 which extends from the transparent panel 30 to a free end 24.

The free end 24 is gathered together in a suitable manner to form an opening 26, such as a threaded string (not shown) or by an elastic member (not shown) in a channel 28. The free end 24 defines the opening 26. During the initial assembly of the light modifier 10, the opening 26 receives the frame 12. Thus, as seen in FIG. 2, the elastic member causes the free end 24 of the cover 14 to snugly engage the frame 12 so that light being admitted from the light source will be captured within the cover 14 and will be admitted through the transparent panels 30 and 32. It is to be understood that the cover 14 can have multiple transparent panels 30 to provide multiple pockets 34 in the cover 14.

The cover 14 can further include a first releasable fastening mechanism 40 such as a loop and hook engagement means including, for example, a section 42 of hooked fiber adjacent an open edge 44 of the pocket 34. A tab 46 can extend from a portion of the cover 14 which comprises a section of hook synthetic material. It is to be understood that various synthetic materials which adhere when pressed together and sold under the trademarks such as Velcro®, Scotchmate®, and Dual Lok® are contemplated as being useful with the present invention. The fastening mechanism 40 allows the gels 36 to be positioned in the pocket 34 in a secure manner during use of the light modifier 10. Further, it should be understood that while the transparent panel 30 has a generally square shape, other configurations can be used.

In certain uses, the image maker may wish to removably attach different densities of diffusion panels on the cover. Therefore, the cover 14 can further include a second releasable fastening mechanism 50, such as a hook and loop engagement means, adjacent the pocket 34 in the cover 14. The second releasable fastening mechanism 50 is attached to first and second side sections 51 and 52 and a bottom section 53 of the cover 14 near the closed edges of the pocket 34. In FIG. 1, the second fastening mechanism 50 is shown as generally extending around substantially the perimeter defined by the first and second sides 51 and 52 and the bottom 53 of the cover 14. It should be understood, however, that the second fastening mechanism 50 can comprise discrete segments (not shown) spaced along the sides 51 and 52 and bottom 53 of the cover 14. The image maker can not only place different gels in the clear pocket 34, but also can place fabric diffusion panels on the front of the cover 14. The second fastening mechanism 50 allows for the simultaneous use of the pocket and diffusion panels.

In other circumstances, the image maker may wish to attach grids (not shown) to the cover 14 in order to direct more light onto a subject without having spillage of light off to the side or on the back ground. For example, a light focusing device (not shown) such as an Egg Crate Grid™ device, sold by the Light Tools Company, has hollow squares positioned one after another. The light passes through the hollow squares and becomes more directional or focused. Therefore, the cover 14 can further include third releasable fastening means 54, such as a hook and loop engagement means, to secure the light focusing device to the cover 14. The third releasable fastening means 54 is positioned on the sides 20 of the cover 14 adjacent corners defined by the transparent panels 30 and 32 and the cover 14, as shown in FIG. 1. The loop part of the third fastening means 54 is attached to the cover 14 and the image maker can attach the hook part of the fastening means to the light focusing device.

Figure 3:
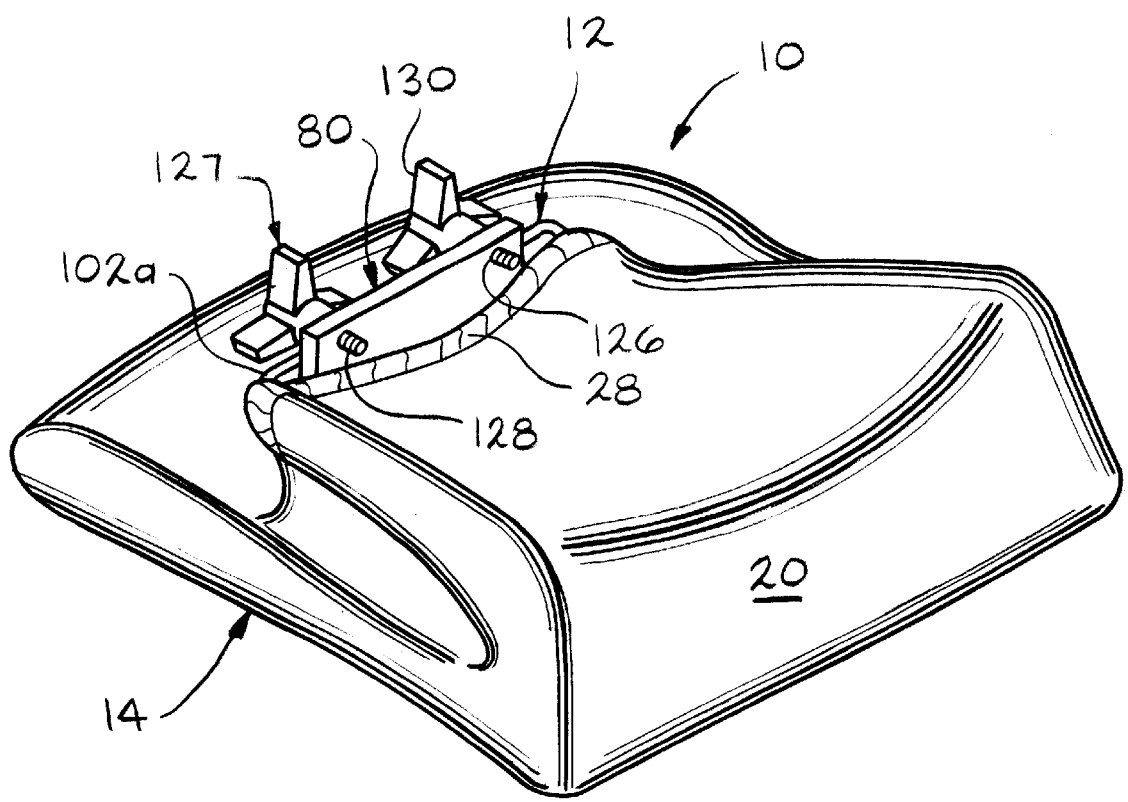
FIG. 3 is a perspective view showing the light modifier in a collapsed position.

The cover 14, when the light modifier 10 is engaged to a light source (not shown), defines a series of wall sections 18, each having a generally square or trapezoidal shape. As can be seen in FIG. 3, when the light modifier 10 is removed from the light source to a collapsed position, as will be described in detail below, the cover 14 simply becomes bunched.

Figure 4:
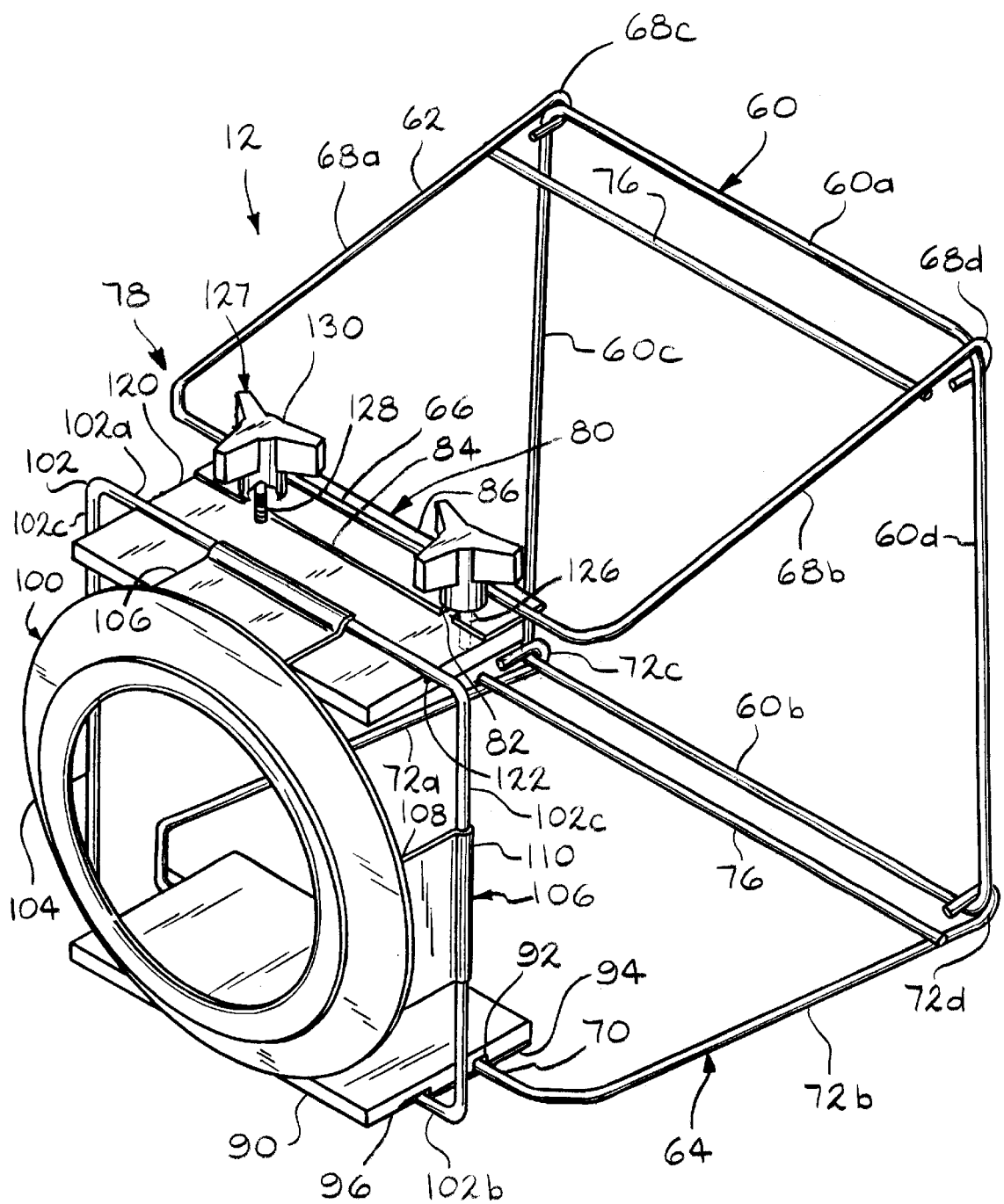
FIG. 4 is a view similar to FIG. 2 but showing only the frame without a cover attached thereto.

Referring now to FIGS. 2 and 4, the frame 12 includes a first support member 60 generally having a preferred shape. However, in embodiments where the support member 60 has a generally oval or circumferential shape, it should be understood that various portions along the curved sections of such circular or oval support members 60 will engage other portions of the frame 12, as will be described in detail below.

The support member 60, though shown as square in shape may have been a desired shape including, but not limited to circular, oval, hexagonal, trapezoidal or the like. Preferably, the shape of the support member 60 will be similar to the shape of the panel 30. The support member 60 may be made of a semi-rigid wire of a size to provide sufficient rigidity to support the cover 14 and yet be light enough in weight to be readily handled. The frame support member 60 has an upper leg 60a, a lower leg 60b, and opposing side legs 60c and 60d.

Pivotally secured to each of the side legs 60c and 60d of the support member 60 is a first side frame member 62 and a second side frame member 64, respectively. In the embodiment shown, the side frame members 62 and 64 generally have a U- or "open square" shape. The side frame member 62 include a rear member 66 and opposing side arms 68a and 68b. The side arm 68a extends from the rear section 66 and pivotally engages the support member 60 at a point adjacent a corner defined by the upper leg 60a and the side leg 60c. The opposite side arm 68b pivotally engages the support member 60 at a point adjacent a corner defined by the upper leg 60a and the opposing side leg 60d.

Similarly, the side frame member 64 has a rear section 70 and opposing arms 72a and 72b. The side arm 72a extends from the rear section 70 and pivotally engages the support member 60 at a point adjacent a corner defined by the lower leg 60b and the side leg 60c. The opposite side arm 72b pivotally engages the support member 60 at a point adjacent a corner defined by the lower leg 60b and opposing side leg 60d. It should be understood that the side members 68a and 68b and 72a and 72b can have distal ends 68c, 68d, 72c and 72d, respectively, which ends form loops around the respective legs of the support member 60. The loops allow the side frame members 62 and 64 to pivot about the support member 60.

In various embodiments, at least one or more support rods 74 can extend from one side arm 68a to the opposing side arm 68b while at one further support rod 76 can extend from the side arm 72a to the side arm 72b. In various embodiments, the support members rods 74 and 76 provide additional rigidity to the frame 12. However, it should be understood that other support rods or no support rods are both fully contemplated as being within the scope of the present invention.

The light modifier 10 of the present invention has a locking means 78 which is mounted on the frame 12 wherein a first or locking plate 80 is suitably secured to the rear section 66 of the side frame member 62. The locking plate 80 can have any desired shape such as rectangular or square and the like. The locking plate 80 can be welded directly onto the rear section 66 at a desired angle. The rectangular plate 80 defines at least one and preferably a plurality of notches 82 which extend from a first edge 84 of the plate 80. The first edge 84 is in opposed relationship to a second edge 86 which is facing the support member 60.

The locking means further comprises a mounting plate 90 is suitably secured to the rear section 70 of the opposing side frame member 64. The mounting plate 90 can have any shape including rectangular or square and the like. The mounting plate 90 defines a first longitudinally extending channel 92 which receives the rear section 70. A further securing member 94 such as a plate can be suitably removably secured (for example, welded or screwed with a fastener 95 as shown in FIG. 1) onto the mounting plate 90 to secure the rear member 70 within the channel 92. The mounting plate 90 pivots about a longitudinal axis defined by the rear member 70.

Attached to the mounting plate 90 is a suitable adapter ring unit 100. It is to be understood that it is within the contemplated scope of the present invention that various adapter rings 100 can be used with the present invention. For example, while not shown, it is within the contemplated scope have an adaptor ring comprise a round insert out of wire which is welded to the frame for receiving a light source. The wire insert adapter ring also allows the image maker to fit a number of different light sources onto the light modifier of the present invention. This allows the image maker to change the type of light being used without the necessity of having multiple adapter rings for each type of light.

It is also within the contemplated scope of the present invention that the use of the adaptor ring 100, as shown, or various wires would allow the image maker, to use for example, round or square lights which can be removeably mounted onto the mounting bracket 90 by detaching the securing member 94 from the mounting plate 90.

Referring to the embodiment of the present invention shown in FIG. 4, the mounting plate 90 further defines a second longitudinally extending channel 96. The longitudinally extending channel 96 receives the adapter ring unit 100. In the embodiment shown, the adapter ring 100 includes a ring mounting fixture 102 which can have any desired shape. The ring mounting fixture 102 preferably has a shape which allows the light modifier 10 to define a generally planar relationship between the support member 60 and the transparent panels 30 and 32 and the adapter ring unit 100. For ease of explanation, the adapter ring 100 is shown as substantially square. The mounting fixture 102 has a generally square shape having top 102a and bottom 102b sections and opposing side sections 102c and 102d. The bottom section 102b is secured within the second channel 96 of the mounting frame 90 such that the mounting frame 90 does not pivot about the section 102b. A ring member 104 is suitably mounted to the fixture 102 by at least one and preferably a plurality of spaced apart flange members 106. The flange members 106 are suitably secured to the ring member 104 at a first end 108 and are welded or otherwise secured to the adjacent portions of the mounting fixture 102 at a second end 110.

The locking means 78 also includes an attachment plate 120 is secured to the top section 102a of the mounting fixture 102 which is opposed to the mounting plate 90. The attachment plate 120 is generally shown as rectangular, but should be understood that other shapes are also useful within the contemplated scope of the present invention. The attachment plate 120 defines a longitudinally extending groove 122 for receiving the section 102a. At least one of the flange members 106 can be secured to the member 102a and, optionally further secured to the attachment plate 120.

The attachment plate 120 further defines at least one or more axially extending openings 126 (as best seen in FIG. 3) for receiving a securing member 127. In the embodiment shown, the securing member 127 comprises a threaded screw member 128 extending from a knob 130. The screw member 128 is threadingly engaged within the threaded opening 126. Each knob 130 can be threadingly and axially moved within the opening 126. The securing mechanism 127 acts as a quick release mechanism.

When the image maker assembles the light modifier 10 just before used, the edge 84 of the locking plate 80 is slidingly positioned under the knob 130. The notches 82 in the locking plate 80 engage the screw member 128 of the knob 130. The knobs 130 can be quickly tightened down to secure or lock the frame 12 into its open position. In the open position, the support member 60, the transparent panels 30 and 32 and the adapter ring 100 are disposed in a substantially parallel relationship. In the open position, the side members 62 are positioned substantially perpendicular to the support member 60. As may be seen in FIG. 3, after removal of the light modifier 10 from a suitable light source (not shown), the knobs 130 can be loosened such that the locking plate 80 is slidably disengaged from the knobs 130.

In order to collapse of the frame 12 within the cover 14, the side member 62 is rotated in a direction toward the support member 60 such that the side member 62 is substantially parallel or planar with the support member 60. Similarly, the adapter ring unit 100 can be pivotally rotated about the rear member 70 such that the ring unit 100 pivots in a direction toward the opposing side member 64. The collapsed ring unit 100 and side member 64 are then pivoted toward the first support member 60. The frame 12, including the adapter ring unit 100, can be stored completely within the cover 14.

Alternatively, the frame 12, including the adapter ring unit 100, can be stored as in the manner shown in FIG. 3 with the knobs 130 extending where the member 60, the side members 62 and 64 and the adapter ring unit 100 pivot in opposite directions such that the knobs 130 are not stored completely within the cover 14. Also, it is within the scope of the present invention that the frame 12 can be partially stored in the cover 14 such that the rear frame section 70 having the adapter ring 100 can be positioned on the exterior of the cover 14. Each of the storage configurations allows the image maker to easily and quickly assemble the diffusive modifier onto a suitable light source.

Still other modifications will be readily apparent to those skilled in the art. For example, the modifier can be used with a light source having a domed cover, glass or plastic or simply a bulb with no plate or cover so long as there is a frame, housing or other support structure. Additionally, the frame is not necessarily planar but could follow a curved path. Accordingly, the scope of the present invention should be limited only to the scope of the appended claims.

I claim:

1. A light modifier comprising:
   an adapter unit for releasably engaging a light source;
   a frame having a support member defining a plane that is spaced apart from the adapter unit;
   the frame having at least one side member extending from the support member in a direction toward the adapter unit;
   a locking means for releasably locking the frame into an open position wherein the adapter unit and support member are in a substantially parallel relationship; and
   a cover positioned over the frame, the cover defining at least one pocket for receiving a light diffusion member.

2. The light modifier of claim 1, wherein the frame is at least partially collapsible within the cover.

3. The light modifier of claim 1, wherein the frame comprises two opposing side members.

4. A light modifier comprising:
   an adapter unit for releasably engaging a light source;
   a frame having a support member defining a plane that is spaced apart from the adapter unit;
   the frame having two opposing side members that are pivotally attached to the support member, the side members extending from the support member in a direction toward the adapter unit;
   a locking means for releasably locking the frame into an open position wherein the adapter unit and support member are in a substantially parallel relationship; and
   a cover positioned over the frame, the cover defining at least one pocket for receiving a light diffusion member.

5. The light modifier of claim 3, wherein the locking means is attached to one side member.

6. A light modifier comprising:
   an adapter unit for releasably engaging a light source;
   a frame having a support member defining a plane that is spaced apart from the adapter unit;
   the frame comprising two opposing side members extending from the support member in a direction towards the adapter unit;
   a locking means comprising a locking plate secured to one side member and an attachment plate secured to the adapter unit wherein the locking plate is releasably secured to the attachment plate to lock the light modifier in the open position wherein the adapter unit and support member are in a substantially parallel relationship; and
   a cover positioned over the frame, the cover defining at least one pocket for receiving a light diffusion member.

7. The light modifier of claim 6, wherein the attachment plate defines at least one opening for receiving a securing member, the securing member releasably securing the locking plate to the attachment plate.

8. The light modifier of claim 1, wherein the adapter unit is configured to receive different shaped light sources.

9. The light modifier of claim 1, wherein the pocket is substantially parallel to the plane defined by the frame.

10. A light modifier comprising:
    an adapter unit for releasably engaging a light source;
    a frame having a support member defining a plane that is space apart from the adapter unit;
    the frame having at least one side member extending from the support member in a direction toward the adapter unit;
    a locking means for releasably locking the frame into an open position wherein the adapter unit and support member are in a substantially parallel relationship; and
    a cover positioned over the frame, the cover defining at least one substantially transparent pocket for receiving a light diffusion member.

11. A light modifier comprising:

an adapter unit for releasably engaging a light source;

a frame having a support member defining a plane that is spaced apart from the adapter unit;

the frame having at least one side member extending from the support member in a direction toward the adapter unit;

a locking means for releasably locking the frame into an open position wherein the adapter unit and support member are in a substantially parallel relationship; and a cover positioned over the frame, the cover defining at least one substantially translucent pocket for receiving a light diffusion member.

12. A light modifier comprising:

an adapter unit for releasably engaging a light source;

a frame having a support member defining a plane that is spaced apart from the adapter unit;

the frame having at least one side member extending from the support member in a direction toward the adapter unit;

a locking means for releasably locking the frame into an open position wherein the adapter unit and support member are in a substantially parallel relationship; and a cover positioned over the frame, the cover defines two or more pockets for receiving a light diffusion member.

13. The light modifier of claim 3, wherein the adapter unit is pivotally attached to one side member.

14. The light modifier of claim 1, wherein the cover includes a first releasable fastening means adjacent an open edge of the pocket.

15. The light modifier of claim 14, wherein the cover includes a second releasable fastening means adjacent closed edges of the pocket in the cover.

16. The light modifier of claim 15, wherein the cover includes a third releasable fastening means adjacent at least one corner of the cover adjacent the pocket.

\* \* \* \* \*